United States Patent
Hasegawa

(10) Patent No.: US 8,781,166 B2
(45) Date of Patent: Jul. 15, 2014

(54) IMAGE PROCESSING APPARATUS AND IMAGE PROCESSING PROGRAM

(75) Inventor: Tomohiko Hasegawa, Okazaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 154 days.

(21) Appl. No.: 13/370,086

(22) Filed: Feb. 9, 2012

(65) Prior Publication Data

US 2012/0219182 A1  Aug. 30, 2012

(30) Foreign Application Priority Data

Feb. 25, 2011   (JP) ................................. 2011-040540

(51) Int. Cl.
  *G06K 9/00*  (2006.01)
(52) U.S. Cl.
  USPC .......................................................... 382/103
(58) Field of Classification Search
  None
  See application file for complete search history.

(56) References Cited

U.S. PATENT DOCUMENTS

| | | | | |
|---|---|---|---|---|
| 2005/0219632 A1* | 10/2005 | Maki et al. | ................... | 358/3.26 |
| 2007/0188809 A1* | 8/2007 | Noda | ........................... | 358/1.18 |
| 2008/0175485 A1* | 7/2008 | Kato | .............................. | 382/203 |
| 2008/0278737 A1* | 11/2008 | Kajihara et al. | ............... | 358/1.9 |
| 2009/0237704 A1* | 9/2009 | Minowa | ....................... | 358/1.14 |
| 2010/0300310 A1* | 12/2010 | Kanekiyo et al. | ............... | 101/35 |
| 2011/0243431 A1* | 10/2011 | Sangappa et al. | ............ | 382/164 |
| 2013/0170756 A1* | 7/2013 | Shibasaki | ...................... | 382/199 |
| 2014/0029022 A1* | 1/2014 | Johnson et al. | ................ | 358/1.2 |

FOREIGN PATENT DOCUMENTS

| | | |
|---|---|---|
| JP | 2005-246699 A | 9/2005 |
| JP | 2006-167965 A | 6/2006 |
| JP | 2007-058934 A | 3/2007 |
| JP | 2007-221675 A | 8/2007 |
| JP | 2010-161622 A | 7/2010 |

* cited by examiner

*Primary Examiner* — Atiba O Fitzpatrick
*Assistant Examiner* — Thomas A James
(74) *Attorney, Agent, or Firm* — Merchant & Gould P.C.

(57) ABSTRACT

An image processing apparatus to extract a print image to be printed onto a print medium from an original image, the image processing apparatus includes: a detecting unit that detects a specific area, which includes a plurality of pixels having a low degree of variation in pixel values, from the original image, based on a predetermined detection criterion; and an extracting unit that, when an extraction range having a predetermined shape including the print image is set in the original image, extracts the print image so that the specific area is disposed in a non-print area, which is not printed on the print medium, within the extraction range.

20 Claims, 15 Drawing Sheets

FIG. 8

| 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 0 | 0 | 0 | 0 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |

IMAGE-SCAN-WINDOW FLAG IMAGE

IMAGE PROCESSING APPARATUS AND IMAGE PROCESSING PROGRAM

CROSS-REFERENCE TO RELATED APPLICATION

This application claims priority from Japanese Patent Application No. 2011-040540 filed on Feb. 25, 2011, the entire subject matter of which is incorporated herein by reference.

TECHNICAL FIELD

This disclosure relates to an image processing technology to extract a portion of an original image as a print image.

BACKGROUND

In the related art, image processes extracts a print image to be printed on a print medium, from an original image. For example, in label printing onto an optical disc such as a compact disc (CD), a digital versatile disc (DVD), or a Blu-ray (a registered trademark) disc (BD) as a print medium, a print image is printed in a printable area on the surface (an annular label surface) of the optical disc, and it is impossible to print any image on the center portion (a portion having an opening formed therein) of the optical disc. Therefore, in a case of setting an extraction range to extract a print image, in an original image, the extraction range includes an area which will not be printed on the print medium. In other words, even if an image is in the extraction range, a portion of the image is omitted from the print image. The omitted portion may make it difficult to grasp the contents of the print image.

For this reason, it has been proposed that a technology that extracts a characteristic object, such as a face of a person or an animal, as a main photographic subject, from an original image, and performs label printing such that the main photographic subject is disposed on a label surface of an optical disc.

SUMMARY

However, since the above-mentioned technology according to the related art is targeted at original images from which characteristic objects is clearly grasped, in a case of an original image such as a landscape photo, from which any characteristic object is not clearly grasped, it is difficult to extract an appropriate print image.

With considering the above, this disclosure is configured to extract a print image in which it is easy to grasp the contents of the image, even when an original image from which any characteristic object is difficult to clearly extract.

The image processing apparatus of this disclosure to extract a print image to be printed onto a print medium from an original image, the image processing apparatus includes: a detecting unit that detects a specific area, which includes a plurality of pixels having a low degree of variation in pixel values, from the original image, based on a predetermined detection criterion; and an extracting unit that, when an extraction range having a predetermined shape including the print image is set in the original image, extracts the print image so that the specific area is disposed in a non-print area, which is not printed on the print medium, within the extraction range.

BRIEF DESCRIPTION OF THE DRAWINGS

The foregoing and additional features and characteristics of this disclosure will become more apparent from the following detailed descriptions considered with the reference to the accompanying drawings, wherein:

FIG. 8 is a view illustrating an image-scan-window flag image;

DETAILED DESCRIPTION

Hereinafter, exemplary embodiments of this disclosure will be described with reference to the accompanying drawings.

[1. First Exemplary Embodiment]
[1-1. Total Configuration]

Figure 1:
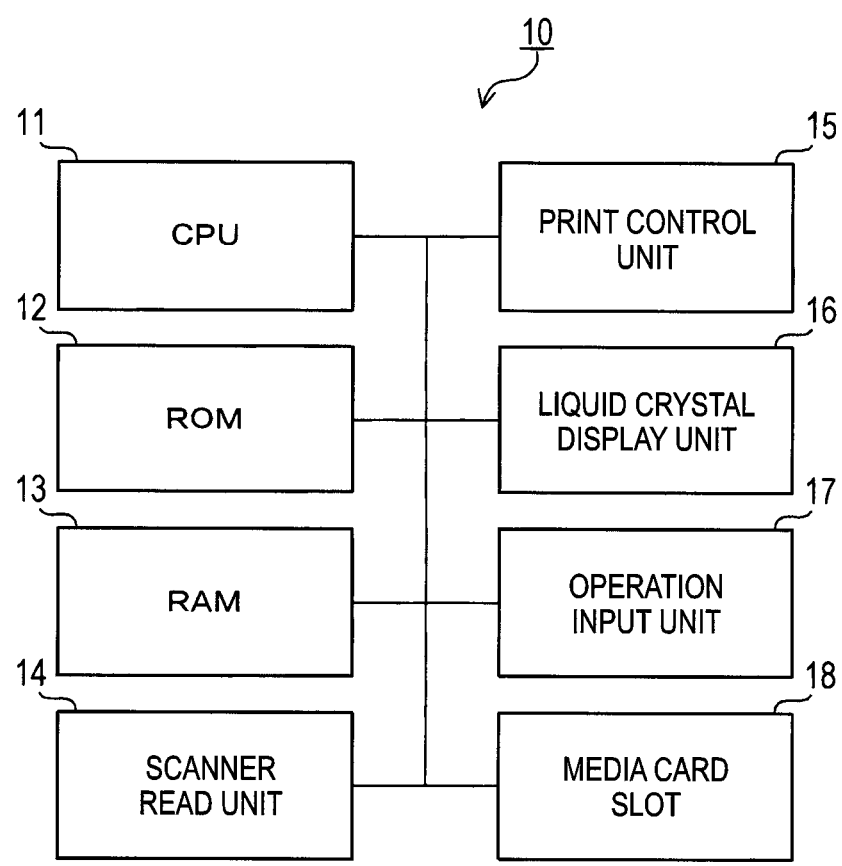
FIG. 1 is a block diagram schematically illustrating a configuration of a multi-function apparatus according to an exemplary embodiment.

FIG. 1 is a block diagram schematically illustrating a configuration of a multi-function apparatus 10 according to a first exemplary embodiment.

The multi-function apparatus 10 is a multi-function apparatus has not only a printer function but also a scanner function, a copy function, and the like, and includes a CPU 11, a ROM 12, a RAM 13, a scanner read unit 14, a print control unit 15, a liquid crystal display unit 16, a operation input unit 17, and a media card slot 18, which are connected to one another through signal lines.

The CPU 11 is a unit for performing all calculations in the multi-function apparatus 10. The ROM 12 is a non-volatile memory. In the ROM 12, with respect to each of a plurality of kinds of print media on which images is able to be printed, information on a shape and physical size of a printable area, a shape, position, and physical size of an unprintable area, and the like is stored as print medium information, in advance. Further, in the ROM 12, a program that makes the CPU 11 execute a media image print process (to be described below) is stored in advance. Here, the physical size unit is a size indicated by a unit of physical length and is a size in the general sense. However, in order to be distinguished from a pixel size (to be described below), which is indicated by a unit of the number of pixels, the size is called as the physical size.

The RAM 13 is a volatile memory to temporarily store calculation results of the CPU 11, input data, and the like.

The print control unit 15 is a device for printing images represented by image data onto the print media and is able to print color images by cyan, magenta, yellow, and block coloring materials (toner, ink, or the like). Further, the print control unit 15 is able to print images on a plurality of kinds of print media such as various sizes of paper and optical discs.

The liquid crystal display unit 16 is a device for displaying images (including an image showing a character string such as a message) on a small color liquid crystal display. The operation input unit 17 is a device that includes various operation keys which can be pushed by a user, for inputting information based on operation. Specifically, the operation input unit 17 includes an up key, a down key, a left key, and a right key to perform up, down, left, and right movement operations, and an OK key to perform deciding the operation.

The media card slot 18 is a device for reading image data from a media card (non-volatile portable storage medium) such as an SD card or a CF card having image data stored therein, and the media card slot 18 is configured to allow a media card to be inserted thereto.

[1-2. Outline of Process]

The multi-function apparatus 10 has a function of directly read out the image data from a media card inserted in the media card slot 18 and a function of printing an image of the read image data onto a print medium (so-called direct print function). Specifically, the multi-function apparatus 10 sets an extraction range corresponding to the outline of a printable area of a print medium, in an image (original image) represented by image data being a print target, and extracts an image within the extraction range as a print image.

However, in case that the print medium has an annular printable area (label surface) and an unprintable area is formed at inner side from the printable area (at the center portion of the print medium), like an optical disc, an unprintable image area is formed at inner side of the print image. In this case, although the extraction range is a range representing the outline of the print image, the entire image in the extraction range is not to be included in the print image, and a portion of the image in the extraction range may be omitted from the print image.

Figure 2A:
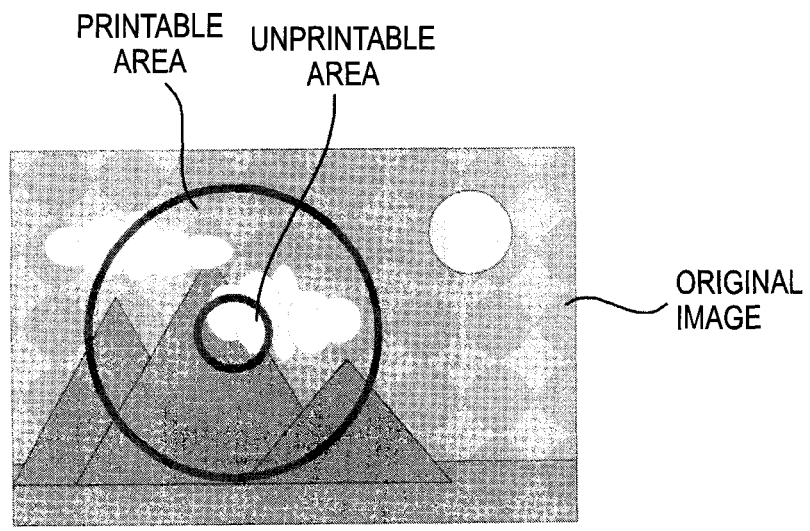
FIG. 2A is a view illustrating an example of label printing in which an changeful image area of an original image is disposed in an unprintable area.
Figure 2B:
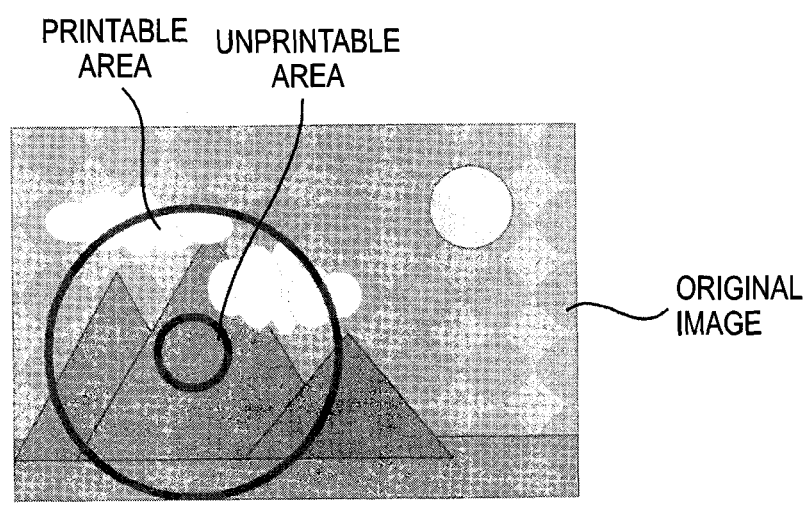
FIG. 2B is a view illustrating an example of label printing in which an non-changeful image area of an original image is disposed in an unprintable area.

For example, when performing label printing of a landscape photo, as shown in FIG. 2A, if a changeful image area (complex area) of an original image is disposed in the unprintable area, it is difficult to grasp the contents of a print image which is printed on the printable area. In contrast, as shown in FIG. 2B, if a non-changeful image area (solid area or the like) of the original image is disposed in the unprintable area, it is easy to grasp the contents of the print image. In other words, the non-changeful image area means a relatively less important portion for grasping the content of the image.

Therefore, the multi-function apparatus 10 of the present exemplary embodiment detects an area, in which a variance value representing a degree of variation in luminance values is low, having a size corresponding to the unprintable area and having a non-changeful image, as a specific area, from the original image. Then, the multi-function apparatus 10 sets an extraction range for a print image in the original image such that the detected specific area is disposed on the unprintable area.

[1-3. Process of CPU]

Figure 3:
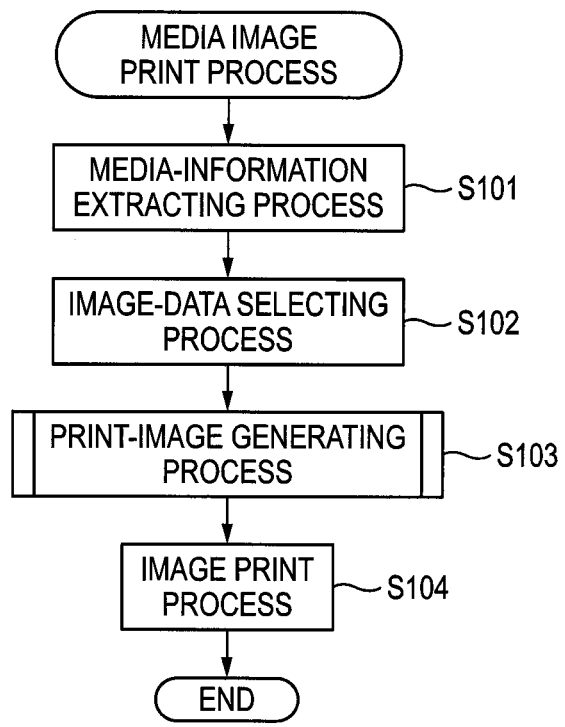
FIG. 3 is a flow chart of a media image print process.

Next, a media image print process performed by the CPU 11 of the multi-function apparatus 10 will be described with reference to a flow chart of FIG. 3. In a media card having image data stored therein being inserted in the media card slot 18, when the user operates the operation input unit 17 to select a media image print mode, a media image print process of FIG. 3 is performed.

When this media image print process starts, in step S101, the CPU 11 performs a media-information extracting process, which reads out information (such as file names and file sizes) on the image data stored in the media card and store the extracted information in the RAM 13.

Subsequently, in step S102, the CPU 11 performs an image-data selecting process, which make the user select an image data of a print target from the plurality of image data stored in the media card. Specifically, the CPU 11 displays a thumbnail image of an image represented by one image data of the plurality of image data stored in the media card, on the liquid crystal display unit 16. Then, the user changes the thumbnail image displayed on the liquid crystal display unit 16 to a thumbnail image of another image data by pushing the up key, the down key, the left key, and the right key of the operation input unit 17, and the user selects an image data corresponding to the displayed thumbnail image, as the print target, by pushing the OK key.

Figure 4:
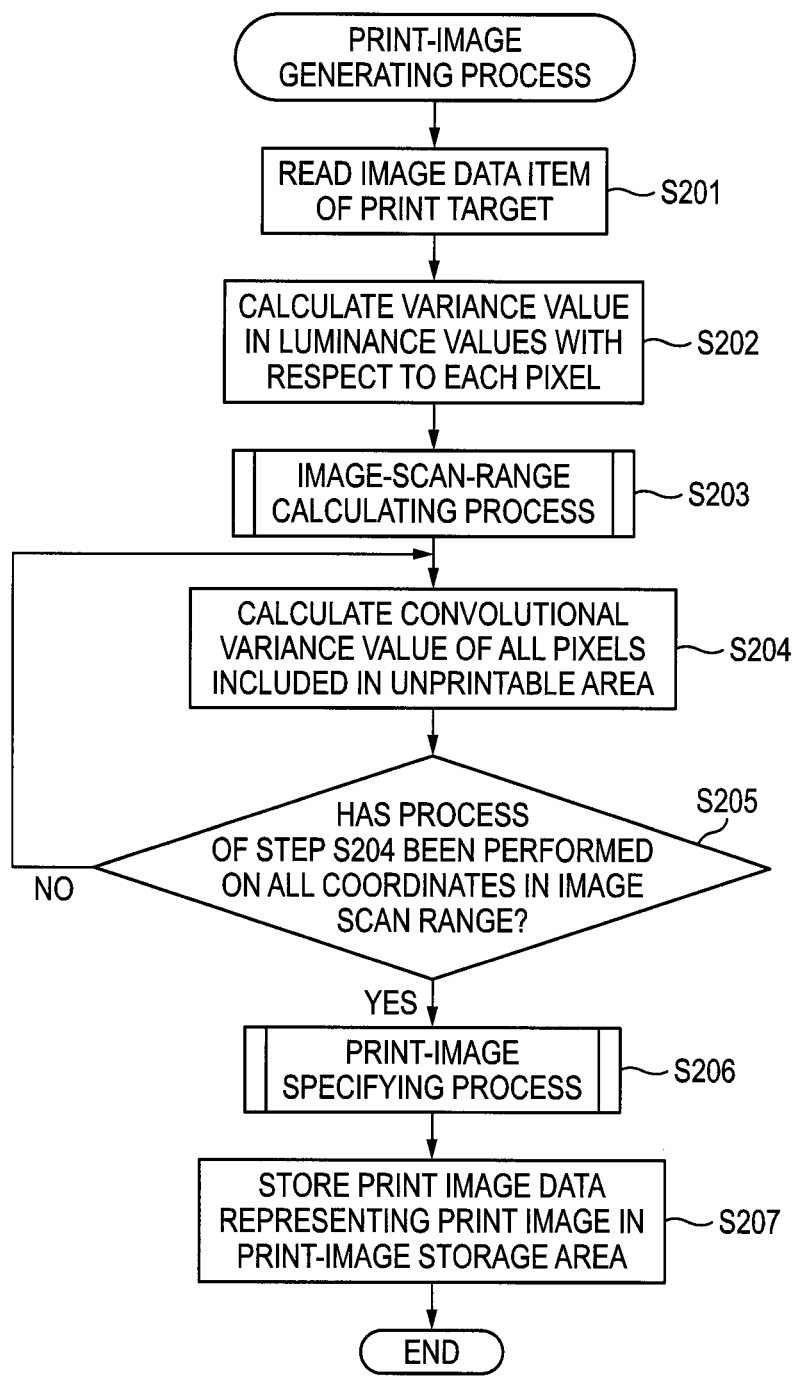
FIG. 4 is a flow chart of a print-image generating process.

Next, in step S103, the CPU 11 performs a print-image generating process, which generates a print image data representing a print image based on the print target. Now, the print-image generating process will be described in detail with reference to a flow chart of FIG. 4.

When the print-image generating process starts, in step S201, the CPU 11 reads out the image data of the print target from the media card. In case that the image data is in a compressed state, a decompression process is performed. In the present exemplary embodiment, a example case, where the form of the read image is a RGB form, will be described. However, the form of the read image is not particularly limited.

Next, in step S202, the CPU 11 calculates a variance value (variance intensity) of luminance values with respect to each of all pixels configuring the image (original image) represented by the image data of the print target, from the following Equations (1) and (2). In Equations (1) and (2), P(x, y) is a luminance value of a target pixel (x, y), Ave(x, y) is an average value of the luminance values (average luminance value) of a plurality of pixels in a circumference range having the target pixel as the center, and E(x, y) is a variance value of the luminance values with respect to the target pixel (x, y). Further, a variable number 'win' determines the circumference range. The luminance value of the target pixel is obtained by performing a color conversion process into a form having luminance components (for example, a color conversion process from RGB into YCC) on the image data.

[Equations]

$$Ave(x, y) = \frac{\sum_{m=-win}^{m \leq win} \sum_{n=-win}^{n \leq win} P(x+m, y+n)}{(2 \times win + 1)^2} \quad (1)$$

$$E(x, y) = \frac{\sum_{m=-win}^{m \leq win} \sum_{n=-win}^{n \leq win} (P(x+m, y+n) - Ave(x, y))^2}{(2 \times win + 1)^2} \quad (2)$$

In the present exemplary embodiment, the value of the variable number 'win' to determine the circumference range is set to 1. In other words, an average luminance value of nine pixels including the target pixel and eight pixels surrounding the target pixel is calculated (from Equation (1)), and an average value of square values of differences between each the luminance values of the nine pixels and the average luminance value is calculated as the variance value for the target pixel (from Equation (2)). In case that the target pixel is located at an edge portion of the original image, the number of surrounding pixels is less than 8. In this case, the average luminance value and the variance value may be calculated only from the target pixel and the existing surrounding pixels. For example, when only three pixels exist around the target pixel, an average luminance value of four pixels including the target pixel is calculated, and an average value of square values of differences between each the luminance values of the four pixels and the average luminance value is calculated as the variance value for the target pixel.

Figure 5:
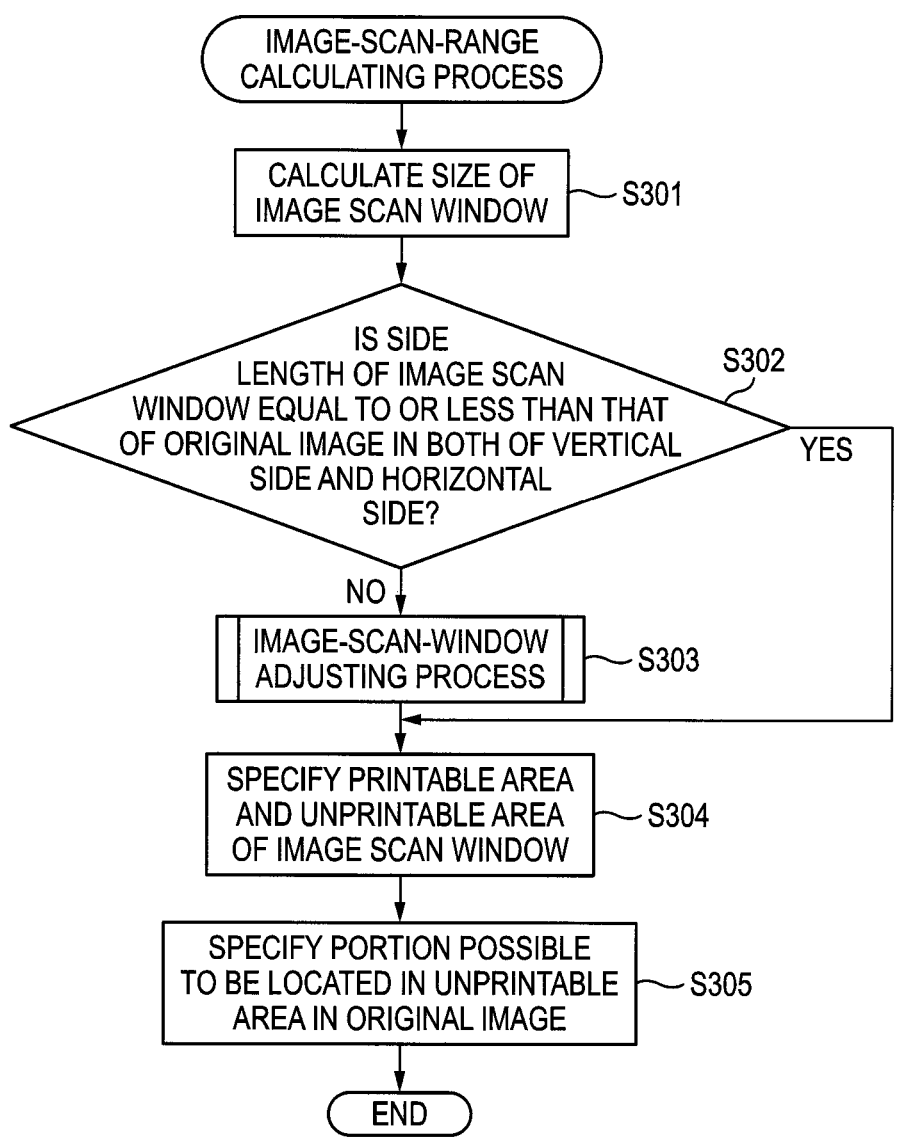
FIG. 5 is a flow chart of an image-scan-range calculating process of a first exemplary embodiment.

Next, in step S203, an image-scan-range calculating process is performed. Now, the image-scan-range calculating process will be described in detail with reference to a flow chart of FIG. 5.

When the image-scan-range calculating process starts, in step S301, the CPU 11 calculates a pixel size of an image scan window to be used for the subsequent processes. The image scan window corresponds to the extraction range for the print image, and the pixel size of the image scan window is set to a pixel size corresponding to the outline of the print image to be printed on the printable area of the print medium. Here, assuming that the print image is printed onto the entire printable area of the print medium, the pixel size corresponding to the outline of the print image is determined based on the physical size of the outline of the printable area and a print resolution. Therefore, it is possible to calculate the pixel size of the image scan window based on the print medium information (the physical size of the outline of the printable area) stored in the ROM 12 and the print resolution. As the physical size of the outline of the printable area increases or the print resolution increases, this calculated pixel size of the image scan window increases.

Here, one example of the pixel size of the image scan window will be shown. In the present exemplary embodiment, based on a fact that the resolution power of human's eyes is about 300 dpi, the print resolution is set to 300 dpi (11.8 pixels per mm).

For examples, an A4 paper sheet (210 mm×297 mm) corresponds to 2480 by 3507 pixel, an L paper sheet (127 mm×89 mm) corresponds to 1500 by 1050 pixel, and a CD label (120 mm×120 mm) corresponds to 1416 by 1416 pixel.

Figure 6:
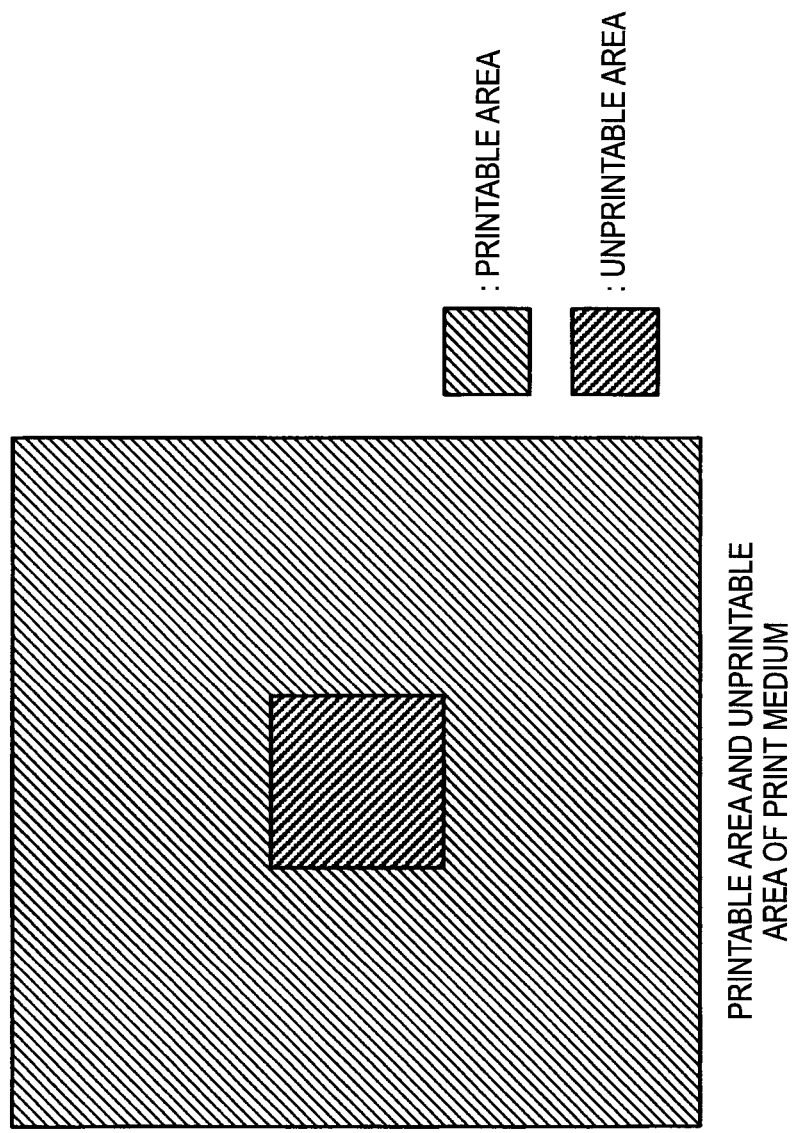
FIG. 6 is a view illustrating a printable area and an unprintable area of a print medium.

In the label printing, the outline of the printable area of the print medium (optical disc) is a circular shape, and the unprintable area at the center portion of the print medium (the opening portion) is also circular. However, for facilitating understanding, in the present exemplary embodiment, as shown in FIG. 6, the description will be made based on the assumption that the outline of the printable area is a square shape and the unprintable area at the center portion of the print medium is also rectangular. In each case that the printable area and the unprintable area have a circular shape or a square shape, the contents of a basic process are identical.

Subsequently, in step S302, the CPU 11 compares the pixel size of the original image and the pixel size of the image scan window. Specifically, the CPU 11 compares a vertical side length and a horizontal side length of the original image with a vertical side length and a horizontal side length of the image scan window, respectively, so that the CPU 11 determines whether the side lengths of the image scan window is equal to or smaller than the side lengths of the original image in both of the vertical side and the horizontal side (that is, the image scan window fits within the original image). In case that it is determined in step S302 that the side lengths of the image scan window is equal to or smaller than the side lengths of the original image in both of the vertical side and the horizontal side, the CPU 11 skips a process of step S303 (to be described below), and proceeds to step S304.

Meanwhile, in case that it is determined that the side lengths of the image scan window is larger than the side lengths of the original image in at least one of the vertical side and the horizontal size (that is, the image scan window is spilled out from the original image), the process proceeds to step S303 in which the CPU 11 performs an image-scan-window adjusting process to adjust the pixel size of the image scan window.

Figure 7:
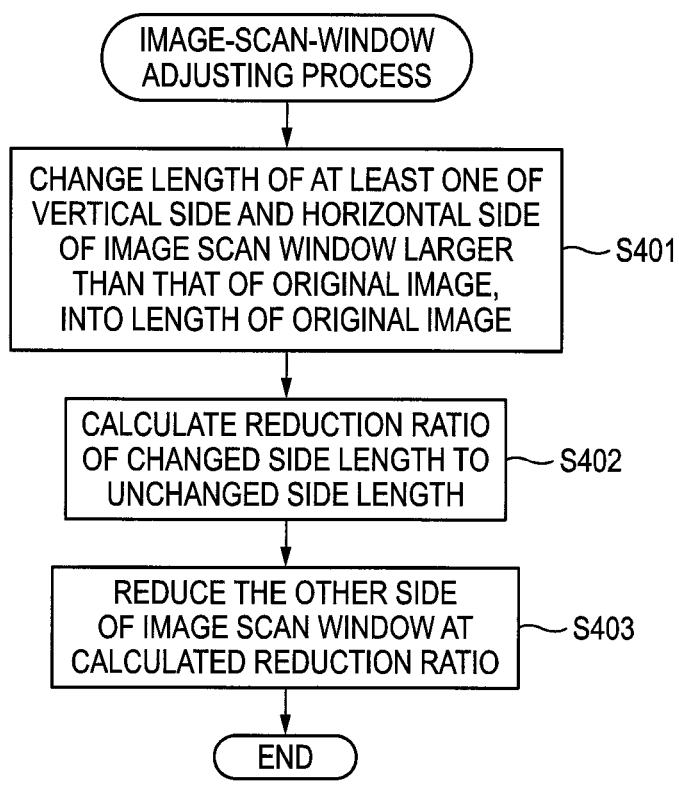
FIG. 7 is a flow chart of an image-scan-window adjusting process.

Now, the image-scan-window adjusting process will be described in detail with reference to a flow chart of FIG. 7. When the image-scan-window adjusting process starts, in step S401, the CPU 11 changes the length of at least one of the vertical side and the horizontal side of the image scan window, which is larger than that of the original image, to that of the original image. In case that the side length of the image scan window is larger than the side length of the original image in both of the vertical side and the horizontal side, the CPU 11 sets one side of the vertical side and the horizontal side having a larger ratio of the side length of the image scan window to the side length of the original image, as a target.

Next, in step S402, the CPU 11 calculates a ratio between the changed length and the original length of the target side (reduction ratio). Then, in step S403, the CPU 11 reduces the other side of the image scan window at the calculated reduction ratio. Consequently, the CPU 11 reduces the vertical side length and the horizontal side length of the image scan window at the same reduction ratio. When the process of step S403 is completed, the CPU 11 finishes the image-scan-window adjusting process of FIG. 7 and proceeds to step S304 of FIG. 5.

Then, in step S304, the CPU 11 specifies a portion corresponding to the printable area of the print medium and a portion corresponding to the unprintable area, in the image scan window. Specifically, the CPU 11 prepares an image-scan-window flag image which is composed of a plurality of flags, each of which represents '1' or '0' in associated with a corresponding pixel included in the image scan window, as shown in FIG. 8. Then, the values of flags of the portion corresponding to the printable area are set to '1', and the values of flags of the portion corresponding to the unprintable area are set to '0'. In other words, the image-scan-window flag image is a binary image having the same pixel size as that of the image scan window. Specifically, as described above, since the position of the unprintable area relative to the printable area of the print medium has been stored as the print medium information in the ROM 12, it is possible to set the values of the flags based on the print medium information. In case that the image-scan-window adjusting process of step S303 has been performed, according to the reduction ratio calculated in that process, the CPU 11 performs a simple thinning process on the image-scan-window flag image, thereby generating an image-scan-window flag image according to the adjusted pixel size.

Figure 9:
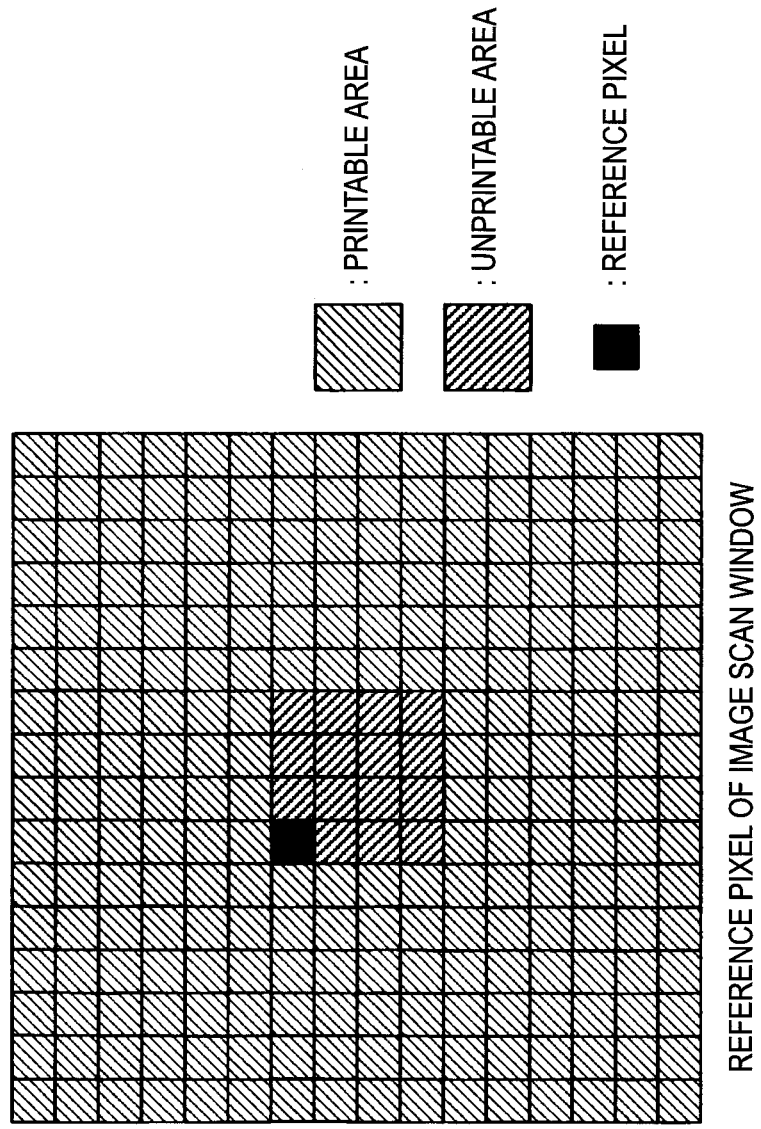
FIG. 9 is a view illustrating a reference pixel of an image scan window.
Figure 10:
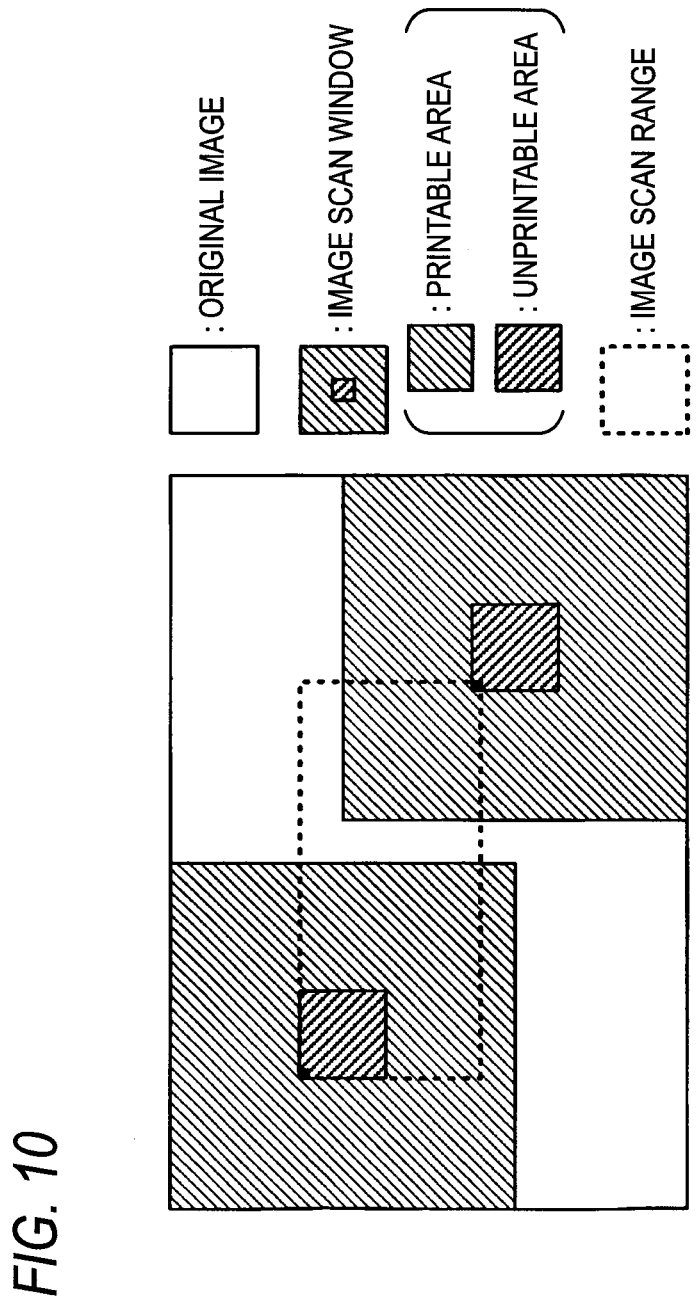
FIG. 10 is a view illustrating an image scan range of the first exemplary embodiment.

Next, in step S305, when extracting the print image by using the image scan window as the extraction range set without spelling out the original image, the CPU 11 specifies a portion which is to be located at the unprintable area of the print medium (a portion which is to be omitted from the print image within the extraction range). In the present exemplary embodiment, as shown in FIG. 9, a pixel at a specific coordinate in the image scan window (an upper-left pixel in the unprintable area in this example) is set as a reference pixel based on the values of the flags of the image-scan-window flag image (FIG. 8). Then, as shown in FIG. 10, when scanning the original image by the image scan window such that the image scan window does not spilled out from the original image, a range in which the reference pixel is scanned is specified as the image scan range. In other words, in the original image, an image in the unprintable areas, in which arbitrary pixels in the image scan range is used as the reference pixel, is specified as a portion, which may be located in the unprintable area of the print medium. Specifically, the CPU 11 prepares an original-image flag image which is composed of a plurality of flags each of which represents '1' or '0' based on each pixel included in the original image, and sets the values of flags in the image scan range to '1', and sets the values the remaining flags to '0'. In other words, when FIG. 10 is regarded as the original-image flag image, the values of flags in the image scan range are set to '1', and the values of flags out of the image scan range are set to '0'. When completing the process of step S305, the process finishes the image-scan-range calculating process of FIG. 5 and proceeds to step S204 of FIG. 4.

Then, in step S204, the CPU 11 selects one of coordinates in the image scan range, as a process target. Then, referring to an unprintable area, in which the pixel at the coordinate of the process target is used as the reference pixel, of the original image, the CPU 11 calculates a convolutional variance value of all pixels included in the unprintable area. Specifically, the CPU 11 integrates the variance values calculated with respect to the each pixels of the unprintable area in step S202, and the CPU 11 stores the integrated value as the convolutional variance value of the unprintable area relative to the coordinate of the process target. Here, the calculated convolutional variance value represents the degree of variation in luminance value of the portion corresponding to the unprintable area, in which the pixel at the coordinate of the process target is used as the reference pixel. As the convolutional variance value decreases, the degree of variation is reduced (a variation of the image is reduced).

Next, in step S205, the CPU 11 determines whether the calculation process of step S204 has been performed on all coordinates of the image scan range. When it is determined in step S205 that there are any unprocessed coordinates, the CPU 11 returns to step S204 in which the above-mentioned process is repeated on one coordinate of the unprocessed coordinates.

Meanwhile, in case that it is determined in step S205 that the calculation process of step S204 has been performed on all coordinates of the image scan range, the process proceeds to step S206 so that a print-image specifying process is performed.

Now, the print-image specifying process will be described in detail with reference to a flow chart of FIG. 11. When the print-image specifying process starts, in step S501, the CPU 11 extracts coordinates, in which the convolutional variance values with respect to the unprintable areas calculated in step S204 are equal to or less than a predetermined threshold value (the threshold value in the present exemplary embodiment is '10'), from all coordinates of the image scan range. Specifically, with respect to coordinates where the convolutional variance values are lager than the predetermined threshold value, the values of the flags of the original-image flag image corresponding to the image scan range is changed from '1' to '0', and then, with respect to coordinates where the convolutional variance values are equal to or less than the predetermined threshold value, the values of the flags are maintained at '1', so that the coordinates where the convolutional variance values are equal to or less than the threshold value are extracted. In other words, in step S501, a non-changeful image area of the original image, such as a dark portion or a blue sky portion, is detected as a specific area having the same pixel size as that of the unprintable area. The threshold value used in the present exemplary embodiment has been experimentally determined to specify the non-changeful image area, and the threshold value is variable in a range between 10 and 20. However, these values are examples, and the threshold value is not limited thereto.

Next, in step S502, the CPU 11 selects one coordinate in the image scan range as a process target, and the CPU 11 determines whether the value of the flag at the coordinate of the process target in the original-image flag image is '1'. When it is determined in step S502 that the value of the flag at the coordinate of the process target is '1', the process proceeds to step S503. In step S503, referring to the printable area, in which the pixel at the coordinate of the process target is used as the reference pixel, in the original image, the CPU 11 calculates the convolutional variance value of all pixels included in the printable area. Specifically, the CPU 11 integrates the variance values calculated for each pixel included in the printable area in step S202, and the CPU 11 stores the integrated value as the convolutional variance value for the printable area relative to the coordinate of the process target. Here, the calculated convolutional variance value represents the degree of variation in luminance values of the portion corresponding to the printable area, in which the pixel at the coordinate of the process target is used as the reference pixel. As the convolutional variance value increases, the degree of variation increases (a variation of the image increases). Thereafter, the process proceeds to step S504.

Meanwhile, in case that it is determined in step S502 that the value of the flag at the coordinate of the process target is '0', the CPU 11 skips the process of step S503 and proceeds to step S504.

In step S504, the CPU 11 determines whether the determination process of step S502 has been performed on all coordinates in the image scan range. When it is determined in step S504 that there are any unprocessed coordinates, the CPU 11 returns to step S502 in which the CPU 11 repeats the above-mentioned process on one coordinate of the unprocessed coordinates.

Meanwhile, when it is determined in step S504 that the determination process of step S502 has been performed on all coordinates in the image scan range, the process proceeds to step S505. In step S505, the CPU 11 specifies, as a specified reference pixel, a pixel at a coordinate, where the convolutional variance value for the printable area calculated in step S503 is the largest of all of coordinates where the values of the flags in the original-image flag image is '1', and the CPU 11 specifies, as the print image, an image of a printable area corresponding to the specified reference pixel. In other words, the CPU 11 extracts a print image, in which the degree of variation in the pixel values of the pixels is the largest, from candidates of the print image satisfying a condition that a specific area is disposed in the unprintable area. When the process of step S505 is completed, the CPU 11 finishes the print-image specifying process of FIG. 11, and the process proceeds to step S207 of FIG. 4.

In step S207, the CPU 11 cuts off the print image from the original image, generates a print image data representing the cut print image, and stores the generated print image data in a print-image storage area prepared in the RAM 13. When the process of step S207 is completed, the CPU 11 finishes the print-image generating process of FIG. 4, and the process proceeds to step S104 of FIG. 3.

In step S104, the CPU 11 performs an image print process to print the print image on the print medium. In the image print process, the CPU 11 performs a color conversion process (from RGB to CMYK) and a binarization process on the print image data stored in the print-image storage area, and the CPU 11 outputs the processed print image data to the print control unit 15. Then, the print control unit 15 prints the print image on the printable area of the print medium. When the process of step S104 is completed, the media image print process of FIG. 3 is finished.

[1-4. Effects]

As described above, according to the multi-function apparatus 10 of the first exemplary embodiment, in the label printing, it is possible to extract a print image from an original image so that a specific area, which is an non-changeful image area, is disposed in an unprintable area at the center portion of an optical disc. Therefore, a less important portion for grasping the contents of the image is to be disposed in the unprintable area, and a highly important portion for grasping the contents of the image is not to be disposed in the unprintable area. Therefore, even when an image is such as a landscape photo, from which any characteristic object may be not clearly grasped, it is possible to extract a print image from which the content of the image is easily grasped.

The specific area, which are the unprintable area, is detected from ranges, in which the image scan window does not spilled out from the original image, of the original image. Therefore, it is possible to suppress the print image from spilling out from the original image. Further, since it is unnecessary to detect a specific area in an area that is not to be the unprintable area, it is possible to reduce an amount of process required for detecting the specific area.

Furthermore, since the print image, in which the degree of variation in the pixel values of the pixels configuring the print image is the largest, is extracted from the candidates for the print image satisfying the condition that the specific area is disposed in the unprintable area, a highly important portion of the original image is easily included in the print image.

In case that the image scan window has a pixel size such that the image scan window spilled out from the original image, the pixel size of the image scan window is reduced. Therefore, it is possible to suppress the print image from spilled out from the original image.

Further, since the non-changeful image area is detected based on the variance value in the luminance values for each of the pixels configuring the original image, it is possible to accurately detect the non-changeful image area.

In the first exemplary embodiment, the multi-function apparatus 10 corresponds to an image processing apparatus, step S202 to step S205, and step S501 correspond to processes of a detecting unit, and step S502 to step S505 correspond to processes of an extracting unit.

[2. Second Exemplary Embodiment]

[2-1. Differences from First Exemplary Embodiment]

Figure 11:
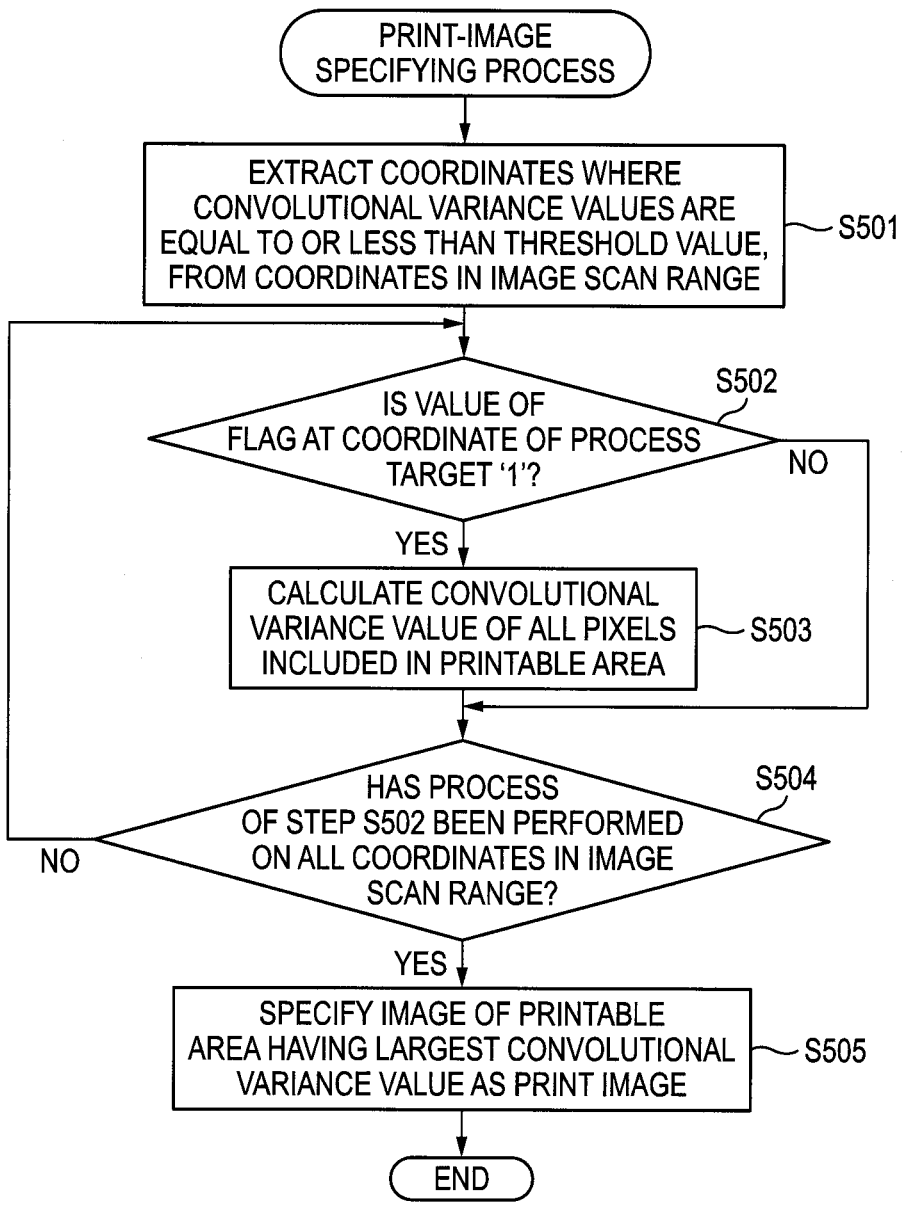
FIG. 11 is a flow chart of a print-image specifying process of the first exemplary embodiment.
Figure 12:
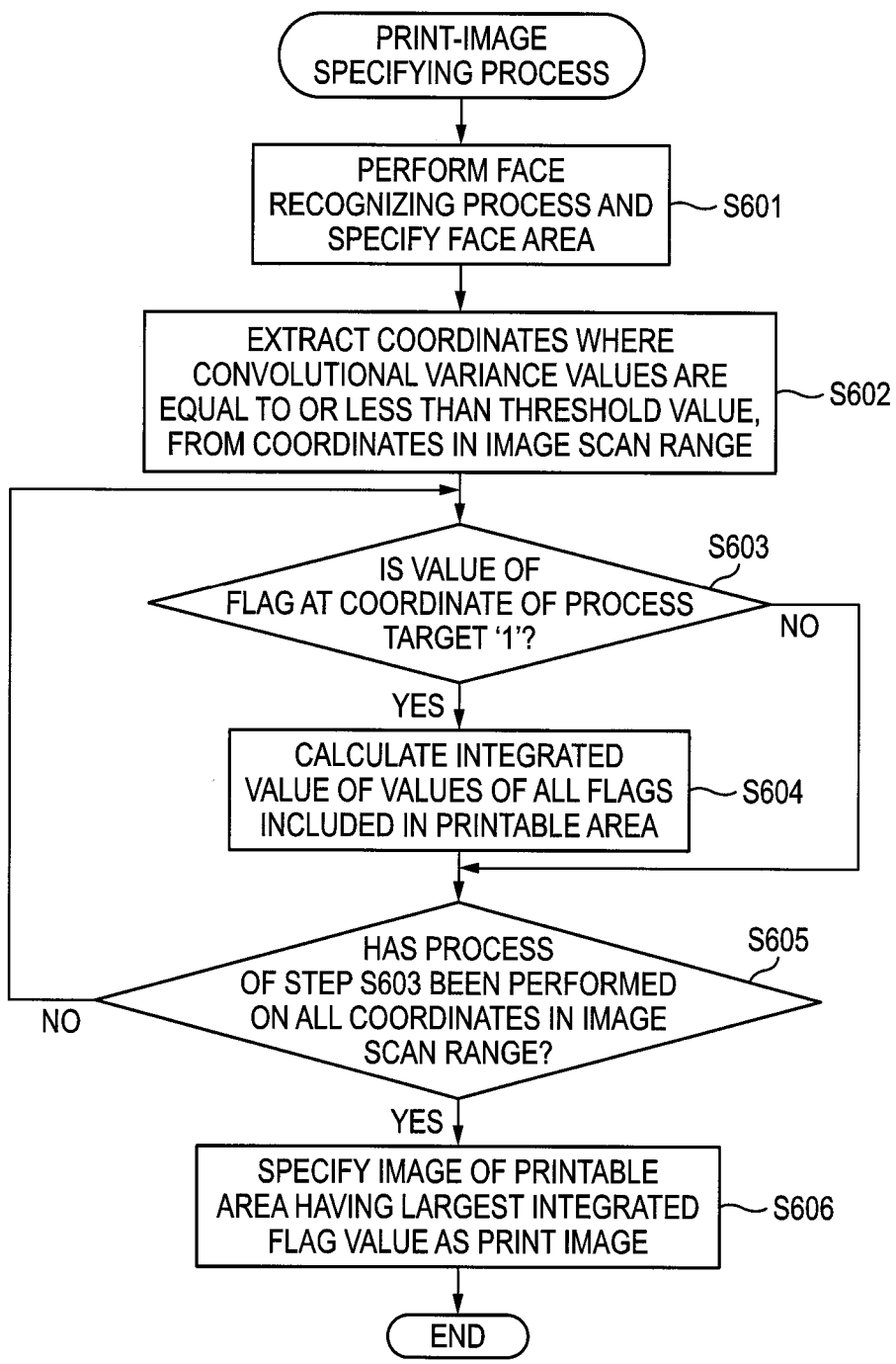
FIG. 12 is a flow chart of a print-image specifying process of a second exemplary embodiment.

A second exemplary embodiment is identical to the first exemplary embodiment except that a print-image specifying process of FIG. 12 is performed instead of the above-mentioned print-image specifying process (FIG. 11). In other words, in the first exemplary embodiment, the print image, in which the degree of variation in the pixel values of the pixels configuring the print image is the largest, is extracted from candidates for the print image satisfying the condition that the specific area is disposed in the unprintable area. Alternatively, in the second exemplary embodiment, a face image is detected from an original image, and an image, in which a face image included in the print image has the largest proportion, is extracted. The description in common with the first exemplary embodiment will be omitted.

[2-2. Print-Image Specifying Process]

Now, a print-image specifying process of a CPU 11 of a multi-function apparatus 10 in the second exemplary embodiment will be described with reference to a flow chart of FIG. 12. The processes of step S602, step S603, and step S605 of FIG. 12 are identical to the processes of step S501, step S502, and step S504 of FIG. 11, and thus will be described in brief.

When the print-image specifying process of FIG. 12 starts, in step S601, the CPU 11 performs a face recognizing process on the entire original image and specifies coordinate information on a rectangular area showing a face image (the upper-left and lower-right coordinates of the rectangular area). Specifically, the CPU 11 prepares a face-recognition flag image which is composed of a plurality of flags each of which represents '1' or '0' based on a corresponding one of the pixels of the original image. The value of flags in a face area is set to '1' and the value of the remaining flags is set to '0'. The face recognizing process is implemented by a known pattern matching algorithm such as an AdaBoost method.

Subsequently, in step S602, the CPU 11 extracts coordinates where the convolutional variance values are equal to or less than a threshold value, from all coordinates in an image scan range. Next, in step S603, the CPU 11 selects one coordinate in the image scan range as a process target, and the CPU 11 determines whether the value of the flag at the coordinate of the process target in the original-image flag image is '1'. When it is determined in step S603 that the value of the flag at the coordinate of the process target is '1', the process proceeds to step S604.

In step S604, referring to a printable area, in which the pixel at the coordinate of the print target is used as the reference pixel, in the face-recognition flag image, the CPU 11 calculates an integrated value of the values of all flags included in the printable area, and stores the integrated value as an integrated flag value for the coordinate of the process target. Then, the process proceeds to step S605.

Meanwhile, when it is determined in step S603 that the value of the flag at the coordinate of the process target is '0', the CPU 11 skips step S604 and proceeds to step S605.

In step S605, the CPU 11 determines whether the determination process of step S603 has been performed on all coordinates in the image scan range. When it is determined in step S605 that there are any unprocessed coordinates, the CPU 11 returns to step S603, and the CPU 11 repeats the above-mentioned process on one coordinate of the unprocessed coordinates.

Meanwhile, when it is determined in step S605 that the determination process of step S603 has been performed on all coordinates in the image scan range, the process proceeds to step S606. In step S606, the CPU 11 specifies, as a specified reference pixel, a pixel at a coordinate where the integrated flag value calculated in step S604 is the largest of all of coordinates where the values of the flags in the original-image flag image are '1', and the CPU 11 specifies, as a print image, an image for a printable area corresponding to the specified reference pixel. In other words, a print image, where the face image included in the print image has the largest proportion, is extracted from the candidates for the print image satisfying the condition that the specific area is disposed in the unprintable area. When the process of step S606 is completed, the print-image specifying process of FIG. 12 finishes.

[2-3. Effects]

As described above, according to the multi-function apparatus 10 of the second exemplary embodiment, in case that a face image is included in an original image, the face image is easily included in the print image. In the second exemplary embodiment, step S202 to step S205, and step S602 correspond to processes of the detecting unit, step S603 to step S606 correspond to processes of the extracting unit, and step S601 corresponds to a process of a face detecting unit.

[3. Third Exemplary Embodiment]

[3-1. Differences from First Exemplary Embodiment]

Figure 13:
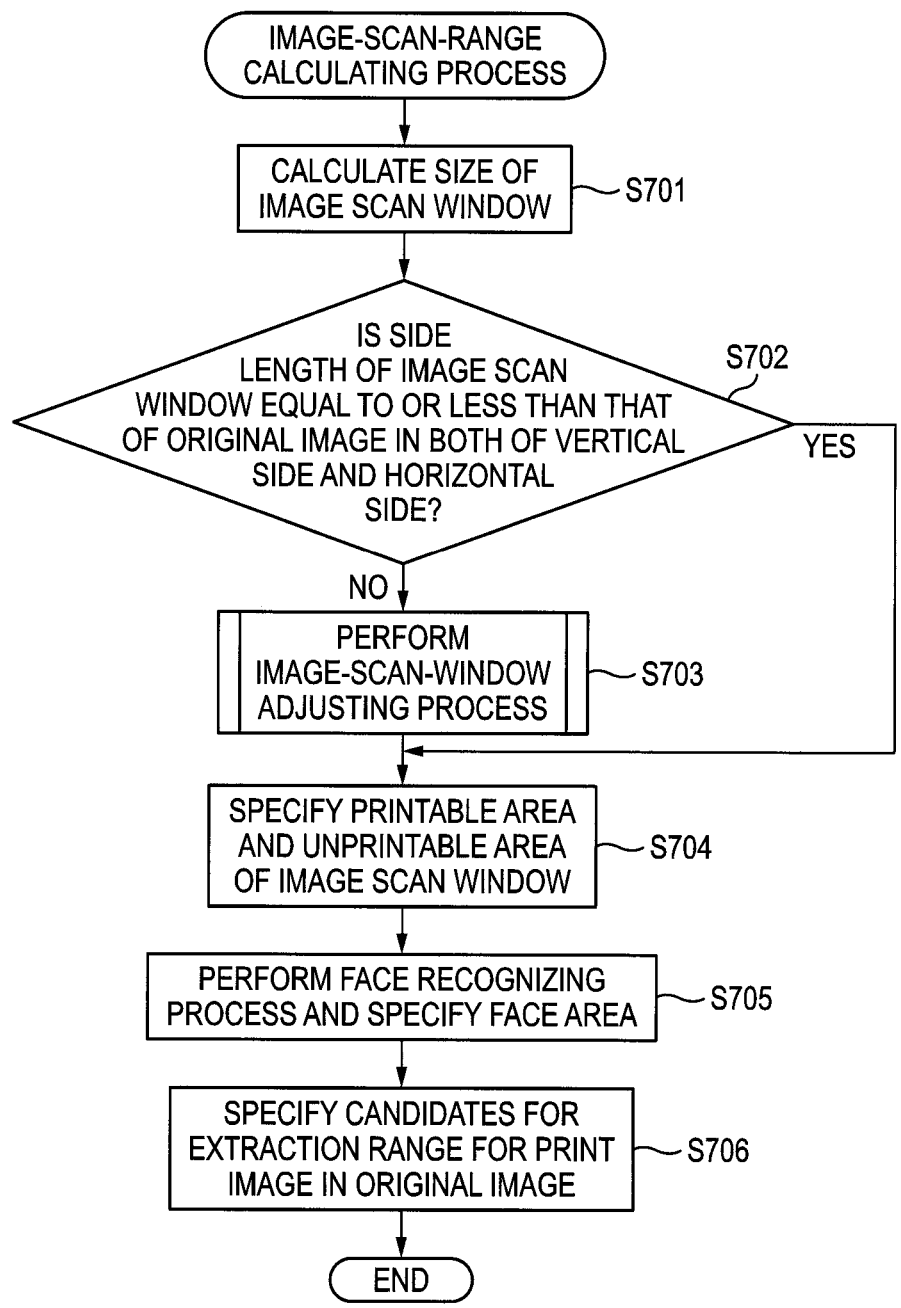
FIG. 13 is a flow chart of an image-scan-range calculating process of a third exemplary embodiment.
Figure 15:
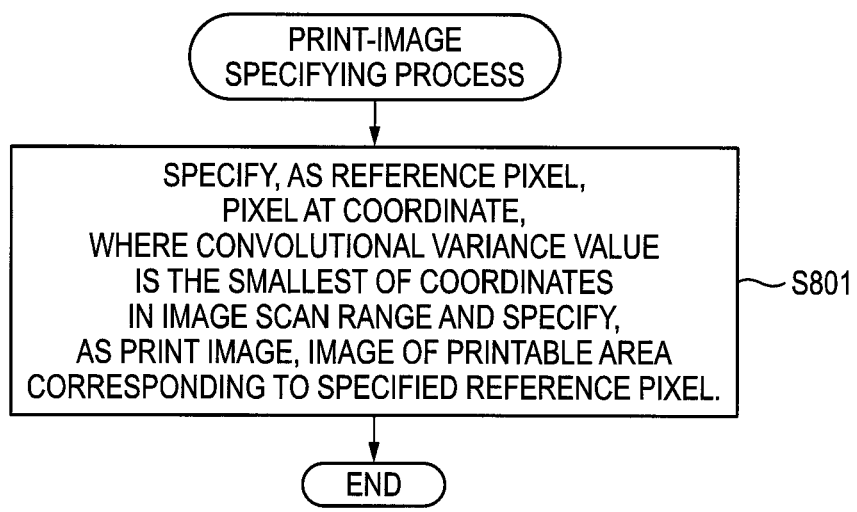
FIG. 15 is a flow chart of a print-image specifying process of the third exemplary embodiment.

A third exemplary embodiment is identical to the first exemplary embodiment except that an image-scan-range calculating process of FIG. 13 is performed, instead of the above-mentioned image-scan-range calculating process (FIG. 5), and that a print-image specifying process of FIG. 15 is performed, instead of the above-mentioned print-image specifying process (FIG. 11). In other words, in the first exemplary embodiment, the print image, in which the degree of variation in the pixel values of the pixels configuring the print image is the largest, is extracted from candidates satisfying a condition that the specific area is disposed in the unprintable area. In contrast, in the third exemplary embodiment, a print image, in which a specific area is disposed in the unprintable area, is extracted from candidates satisfying a condition that a face image is included in an extraction range. Hereinafter, descriptions in common with the first exemplary embodiment will be omitted.

[3-2. Image-Scan-Range Calculating Process]

Now, an image-scan-range calculating process of a CPU 11 of a multi-function apparatus 10 of a third exemplary embodiment will be described with reference to a flow chart of FIG. 13. The processes of step S701 to step S704 of FIG. 13 are identical to the processes of step S301 to step S304 of FIG. 5 and thus will be described in brief.

When the image-scan-range calculating process of FIG. 13 starts, in step S701, the CPU 11 calculates a pixel size of an image scan window.

Subsequently, in step S702, the CPU 11 determines whether the side length of the image scan window is equal to or less than the side length of the original image in both of a vertical side and a horizontal side. Then, if it is determined that at least one of the vertical side and the horizontal side of the image scan window is larger than that of the original image, the process proceeds to step S703 in which the CPU 11 performs the image-scan-window adjusting process (FIG. 7). Then, the process proceeds to step S704. Meanwhile, when it is determined that the side length of the image scan window is equal to or less than the side length of the original image in both of the vertical side and the horizontal side, the process proceeds to step S704.

In step S704, the CPU 11 specifies a portion corresponding to the printable area of the print medium and a portion corresponding to the unprintable area, in the image scan window. Next, in step S705, the CPU 11 performs a face recognizing process on the entire original image, and the CPU 11 specifies coordinate information of a face area showing a face image. This process of step S705 is identical to the process of step S601 of the print-image specifying process (FIG. 12) of the second exemplary embodiment. Therefore, in a face-recognition flag image, the values of flags in the face area showing the face image are set to '1', and the values of the remaining flags are set to '0'.

Figure 14:
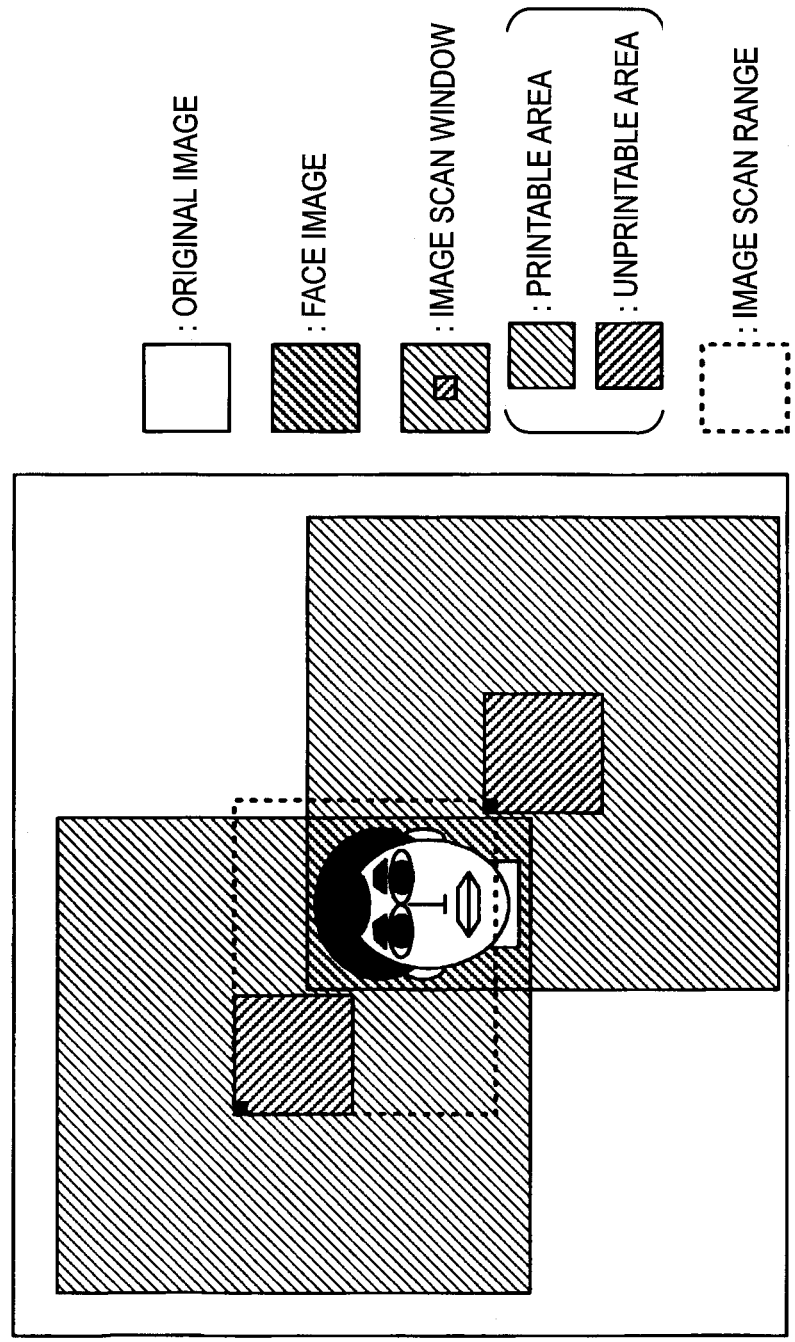
FIG. 14 is a view illustrating an image scan range of the third exemplary embodiment.

Next, in step S706, the CPU 11 specifies portions, which is to be an extraction range for the print image, in the original image, under the conditions that the image scan window does not spilled out from the original image and all pixels having '1' as the values of the flags of the face-recognition flag image are included in the image scan window. Specifically, like the above-mentioned step S305 of FIG. 5, based on the values of the flags of the image-scan-window flag image, a pixel at a specific coordinate in the image scan window (the pixel at the upper-left coordinate in the unprintable area) is set as a reference pixel (FIG. 9). Then, as shown in FIG. 14, in a case of scanning the original image with the image scan window such that the image scan window does not spilled out from the original image and the image scan window includes the entire face image, a range where the reference pixel is scanned is specified as an image scan range. In the example of FIG. 14, scanning with the image scan window is performed within a rectangular range from a position where the coordinate of a lower-right pixel of an image scan window corresponds to the coordinate of the lower-right pixel of the face image to a position where the coordinate of the upper-left pixel of the image scan window corresponds to the coordinate of the upper-left pixel of the face area. In other words, in the original image, an image in the unprintable areas, in which arbitrary pixels in the image scan range is used as the reference pixel, is specified as a portion, which may be the unprintable area of the print medium. Specifically, an original-image flag image, which is composed of flags corresponding to the individual pixels of the original image, is prepared, and the values of flags in the image scan range are set to '1' and the values of the remaining flags are set to '0'. In case that the image scan window is smaller than the face area, the face area is scanned with the image scan window.

When the process of step S706 is completed, the image-scan-range calculating process of FIG. 13 finishes.

[3-3. Print-Image Specifying Process]

Next, a print-image specifying process of a CPU 11 of a multi-function apparatus 10 of a third exemplary embodiment will be described with reference to a flow chart of FIG. 15.

When the print-image specifying process starts, in step S801, the CPU 11 specifies, as a specified reference pixel, a pixel at the coordinate where the convolutional variance value (the value calculated in step S204) is the smallest of all coordinates in the image scan range, and the CPU 11 specifies, as a print image, an image of a printable area corresponding to the specified reference pixel. In other words, a print image, in which the specific area is disposed in the unprintable area, is extracted from the candidates for the print image satisfying the condition that the face image is included in the extraction range. When the process of step S801 is completed, the print-image specifying process of FIG. 15 finishes.

[3-4. Effects]

As described above, according to the multi-function apparatus 10 of the third exemplary embodiment, the face image is easily included in the print image, as compared to a case of extracting a print image in which the proportion of the face image included in the print image is to be large, from the candidates for the print image satisfying the condition that the specific area is disposed in the unprintable area similarly to the second exemplary embodiment. In the third exemplary embodiment, step S202 to step S205, and step S801 correspond to the processes of the detecting unit and the extracting unit, and step S705 corresponds to the process of the face detecting unit.

[4. Other Exemplary Embodiments]

The exemplary embodiments of this disclosure have been described. However, this disclosure is not limited to the above-mentioned exemplary embodiments, and other forms will be applied.

(1) In the above-mentioned exemplary embodiments, the pixel size of the image scan window is calculated based on the print resolution of 300 dpi (step S301). However, this disclosure is not limited thereto. For example, the pixel size of the image scan window may be calculated based on a print resolution set by the user.

(2) In the above-mentioned exemplary embodiments, based on the variance value in luminance values for each pixel configuring the original image, an non-changeful image area is detected (step S202). However, this disclosure is not limited thereto. For example, a variance value in pixel values (tone values) for each pixel in each of R, G, and B plains is calculated, and the non-changeful image area may be detected based on average variance values for each pixel. In this case, it is possible to omit the color conversion process into a form having luminance components.

(3) In the above-mentioned exemplary embodiment, in order to detect the specific non-changeful image area, coordinates where the convolutional variance values are equal to or less than the threshold value are extracted from the image scan range (step S501). However, this disclosure is not limited thereto. For example, a predetermined number of coordinates may be sequentially extracted from the coordinate where the convolutional variance value is the smallest.

(4) In the above-mentioned exemplary embodiments, one print image to be extracted from the original image is automatically determined, and the determined print image is extracted. However, this disclosure is not limited thereto. For example, a plurality of candidates for the print image may be specified and be displayed on the liquid crystal display unit 16, so as to enable the user to select the print image. In this case, it is suppressed that an inappropriate image is extracted as the print images and the user's trouble is reduced, as compared to case that the user selects the print image in a state in which there is no candidate.

(5) In the above-mentioned exemplary embodiments, it is assumed that the print image is printed over the entire printable area. However, this disclosure is not limited thereto. For example, even in a case of printing a print image of a specific shape (for example, a print image having an annular shape like a label surface) onto a general print medium such as an A4 paper sheet, it is possible to obtain the same effects by the above-mentioned processes. In other words, the extraction range is not limited to a range corresponding to the outline of the printable area of the print medium. Further, the print image is not limited to an image having a non-print area formed on the inner side thereof. For example, in a case of extracting a image having a shape, such as a heart shape or a star shape, other than the rectangular shape, from a rectangular extraction range including the print image, since the non-print area is formed within the extraction range, it is possible to obtain the same effects by the above-mentioned processes. The extraction range is not limited to the rectangular shape, but may be selected from a plurality of shapes or may be arbitrarily designated by the user. In this case, an arbitrary shape can be designated by drawing the arbitrary shape on a touch panel or reading the arbitrary shape drawn on a paper sheet or the like by the scanner function.

(6) In the above-mentioned exemplary embodiments, this disclosure was applied to the multi-function apparatus 10. However, this disclosure is not limited thereto, but this disclosure can also be applied to a print apparatus (for example, a print apparatus without a scanner function) or the like other than the multi-function apparatus. This disclosure can be applied to not only the print apparatus but also an information processing apparatus such as a personal computer, programs which are executable in the information processing apparatus, and so on.

What is claimed is:

1. An image processing apparatus configured to extract a print image to be printed onto a print medium from an original image, the image processing apparatus comprising:
a processor;
a memory storing computer-readable instructions that, when executed by the processor, instruct the processor to function as:
a calculating unit that calculates a variation based on respective pixel values of a plurality of pixels;
a detecting unit that detects a specific area from the original image, based on the variation; and
an extracting unit that, when an extraction range having a predetermined shape including the print image is set in the original image, extracts the print image so that the specific area is disposed in a non-print area, which is not printed on the print medium, within the extraction range.

2. The image processing apparatus according to claim 1,
wherein the print image is an image having the non-print area formed on the inner side thereof, and
wherein the extraction range is a range representing an outline of the print image.

3. The image processing apparatus according to claim 2,
wherein the print medium is an optical disc,
wherein the print image is an image to be printed onto an annular label surface of the optical disc, and
wherein the non-print area is an unprintable area at a center portion of the optical disc.

4. The image processing apparatus according to claim 1, wherein the detecting unit detects the specific area from a candidate range, which is possible to be the non-print area, and which satisfies a condition that the extraction range does not spill out from the original image.

5. The image processing apparatus according to claim 1, wherein the extracting unit extracts the print image having a high degree of variation in pixel values of the pixels forming the print image, from candidates for the print image satisfying a condition that the specific area is disposed in the non-print area.

6. The image processing apparatus according to claim 1, further comprising:
a face detecting unit that detects a face image in the original image,
wherein the extracting unit extracts the print image so that the face image has a large proportion of the print image.

7. The image processing apparatus according to claim 6, wherein the extracting unit extracts the print image in which the specific area is disposed in the non-print area, from the candidates for the print image satisfying a condition that the face image is included in the extraction range.

8. The image processing apparatus according to claim 1,
wherein the extracting unit specifies a plurality of candidates for the print image to be selected by operation, and
wherein the extracting unit extracts the print image selected by the operation.

9. The image processing apparatus according to claim 1, wherein, in case that the extraction range has a size such that the extraction range spills out from the original image, the extracting unit reduces the size of the extraction range.

10. The image processing apparatus according to claim 1, wherein the detecting unit detects the specific area having a size corresponding to the non-print area.

11. The image processing apparatus according to claim 1,
wherein the detecting unit calculates an indicator value indicating a degree of variation in pixel values of an area including a plurality of pixels,
wherein the detecting unit detects an area having the calculated indicator value equal to or less than a threshold value, as the specific area.

12. The image processing apparatus according to claim 11, wherein the indicator value is a variance value.

13. A non-transitory computer-readable medium storing computer-readable instructions that, when executed by a processor of an image processing apparatus, instruct the image processing device to perform a method of extracting a print image to be printed onto a print medium from an original image, the method comprising:

calculating a variation based on respective pixel values of a plurality of pixels;

detecting a specific area from the original image, based on the variation; and extracting, when an extraction range having a predetermined shape including the print image is set in the original image, the print image so that the specific area is disposed in a non-print area, which is not printed on the print medium, within the extraction range.

14. The image processing apparatus according to claim 1, wherein the extraction range is set based on a reference pixel, wherein a plurality of the extraction ranges are respectively set based on a plurality of reference pixels so that the extraction range does not extend beyond the original image, based on a size of the print image, and wherein the calculating unit calculates a plurality of variations for the plurality of reference pixels, such that a variation is calculated for each of the plurality of reference pixels.

15. The image processing apparatus according to claim 1, wherein the processor further functions as:

a specifying unit that specifies a range, within which the extraction range does not extend beyond the original image, based on a size of the print image, wherein the specifying unit specifies a candidate area, which is possible to be the non-print area within the specified area, wherein the detecting unit detects an area, of which the variation is lower than a predetermined value, from the specified candidate area and sets the detected area as the specific area, and wherein the extracting unit extracts and sets the print image as a portion of the original image within the extraction range, the extraction range being such that a variations of a printable area other than the non-print area is greater than other variations of printable areas other than the non-print area that correspond to other extraction ranges and the detected area detected by the detecting unit and set as the specific area is included in the non-print area.

16. The image processing apparatus according to claim 1, wherein the processor further functions as:

a face image detecting unit that detects a face image from the original image; and a specifying unit that specifies a range, within which the extraction range does not extend beyond the original image, based on a size of the print image, wherein the specifying unit specifies a candidate area, which is possible to be the non-print area within the specified area, wherein the detecting unit detects an area, of which the variation is lower than a predetermined value, from the specified candidate area and sets the detected area as the specific area, and wherein the extracting unit extracts and sets as the print image a portion of the original image within the extraction range, the extraction range being such that the face image is located in a printable area other than the non-print area and the detected area detected by the detecting unit and set as the specific area is included in the non-print area.

17. The image processing apparatus according to claim 1, wherein the variation is a variance value of the respective pixel values of all of the pixels of the plurality of pixels.

18. The image processing apparatus according to claim 17, wherein the respective pixel values of the pixels of the plurality of pixels are luminance values of the pixels of the plurality of pixels.

19. The image processing apparatus according to claim 17, wherein the plurality of pixels consists of all pixels within a circumference centered about a target pixel.

20. The image processing apparatus according to claim 17, wherein the plurality of pixels consists of all pixels immediately surrounding a target pixel.

* * * * *